US010382304B2

(12) United States Patent
Braun et al.

(10) Patent No.: US 10,382,304 B2
(45) Date of Patent: Aug. 13, 2019

(54) METHODS AND APPARATUS FOR CONTROLLING MULTIPLE-INPUT AND MULTIPLE-OUTPUT OPERATION IN A COMMUNICATION DEVICE BASED ON QUALITY OF SERVICE

(71) Applicant: MOTOROLA MOBILITY LLC, Chicago, IL (US)

(72) Inventors: Mark Braun, Arlington Heights, IL (US); Santhosh Kumar Gillella, Mundelein, IL (US); Ranjeet Gupta, Chicago, IL (US); Mary Hor-Lao, Chicago, IL (US); Sudhir C. Vissa, Bensenville, IL (US)

(73) Assignee: Motorola Mobility LLC, Chicago, IL (US)

( * ) Notice: Subject to any disclaimer, the term of this patent is extended or adjusted under 35 U.S.C. 154(b) by 100 days.

(21) Appl. No.: 14/734,556

(22) Filed: Jun. 9, 2015

(65) Prior Publication Data
US 2016/0295447 A1    Oct. 6, 2016

Related U.S. Application Data

(60) Provisional application No. 62/141,015, filed on Mar. 31, 2015.

(51) Int. Cl.
*H04B 7/0426* (2017.01)
*H04W 52/02* (2009.01)
(Continued)

(52) U.S. Cl.
CPC ....... *H04L 43/0847* (2013.01); *H04B 7/0413* (2013.01); *H04B 7/0426* (2013.01);
(Continued)

(58) Field of Classification Search
CPC ..... H04W 28/18–26; H04W 24/02–10; H04W 52/261–267; H04W 52/0261–0267; H04W 52/0274–028
See application file for complete search history.

(56) References Cited

U.S. PATENT DOCUMENTS 8,457,029 B2 * 6/2013 Vaidya .................. G06F 1/3203
370/311
2009/0098914 A1 * 4/2009 Martin-Cocher .........................
H04W 52/0261
455/572

(Continued)

OTHER PUBLICATIONS

Hang Yu, Lin Zhong, Ashutosh Sabharawal: Power Management of MIMO Network Interfaces on Mobile Systems, Very Large Scale Integration (VLSI) Systems, IEEE Transactions on (vol. 20, Issue:7, Jun. 23, 2011, pp. 1175-1186.

(Continued)

*Primary Examiner* — Marcus Smith

(57) ABSTRACT

A method for controlling multiple-input and multiple-output operation in a communication device includes communicating data using multiple-input and multiple-output operation, determining a set of parameters that indicate quality of service associated with communicating the data to another device, and comparing the set of parameters to a set of thresholds. When one or more parameters in the set of parameters exceed one or more thresholds in the set of thresholds, the multiple-input and multiple-output operation is disabled.

17 Claims, 6 Drawing Sheets

FIG. 4

(51) Int. Cl.
*H04W 28/02* (2009.01)
*H04B 7/06* (2006.01)
*H04L 12/26* (2006.01)
*H04B 7/0413* (2017.01)

(52) U.S. Cl.
CPC ........... *H04B 7/0686* (2013.01); *H04L 43/16* (2013.01); *H04W 28/0236* (2013.01); *H04W 52/0258* (2013.01); *H04W 28/0242* (2013.01); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/146* (2018.01); *Y02D 70/444* (2018.01)

(56) References Cited

U.S. PATENT DOCUMENTS

| | | | | |
|---|---|---|---|---|
| 2011/0195741 | A1* | 8/2011 | Kim | H04B 7/0689 455/522 |
| 2012/0009930 | A1* | 1/2012 | Brisebois | H04W 76/28 455/450 |
| 2014/0219111 | A1* | 8/2014 | Du | H04W 24/02 370/252 |
| 2014/0269994 | A1* | 9/2014 | HomChaudhuri | H04W 52/0209 375/316 |
| 2014/0307819 | A1* | 10/2014 | Paulraj | H04W 28/0215 375/267 |
| 2015/0245409 | A1* | 8/2015 | Medapalli | H04W 76/04 370/329 |
| 2015/0365889 | A1* | 12/2015 | Rajendran | H04W 52/0206 455/453 |
| 2016/0149684 | A1* | 5/2016 | Zhao | H04B 7/0413 370/252 |
| 2016/0157133 | A1* | 6/2016 | Ehsan | H04W 28/22 370/252 |
| 2016/0226566 | A1* | 8/2016 | Hirsch | H04B 7/0452 |
| 2016/0233929 | A1* | 8/2016 | van Zelst | H04L 5/001 |

OTHER PUBLICATIONS

Hongseok Kim; Chan-Byoung Chae; de Veciana, G.; Heath, R.W.: "A cross-layer approach to energy efficiency for adaptive MIMO systems exploiting spare capacity", Wireless Communications, IEEE Transactions on Year: Aug. 2009, vol. 8, Issue: 8, pp. 4264-4275.

Hongseok Kim; Chan-Byoung Chae; de Veciana, G.; Heath, R.W.: "Energy-efficient adaptive MIMO systems leveraging dynamic spare capacity", Information Sciences and Systems, 2008, CISS 2008, 42nd Annual Conference, 2008, IEE Conference Publications, pp. 66-73.

Siam, Mohammad Z. et al.: "Energy-efficient protocols for wireless networks with adaptive MIMO capabilities", Wireless Networks vol. 16, Issue 1, (2010), pp. 199-212, DOI 10.1007/s11276-008-0124-3.

\* cited by examiner

METHODS AND APPARATUS FOR CONTROLLING MULTIPLE-INPUT AND MULTIPLE-OUTPUT OPERATION IN A COMMUNICATION DEVICE BASED ON QUALITY OF SERVICE

RELATED APPLICATIONS

The present application is related to and claims benefit under 35 U.S.C. § 119(e) from U.S. Provisional Patent Application Ser. No. 62/141,015, filed Mar. 31, 2015, titled "METHODS AND APPARATUS FOR CONTROLLING MULTIPLE-INPUT AND MULTIPLE-OUTPUT OPERATION IN A COMMUNICATION DEVICE", the entire contents of which are incorporated herein by reference.

FIELD OF THE DISCLOSURE

The present disclosure relates to controlling multiple-input and multiple-output operation in a communication device, and more particularly to controlling multiple-input and multiple-output operation in a communication device based on a set of parameters that indicate quality of service.

BACKGROUND

When communicating data, wireless communication devices that are not plugged into a power source rely on a battery source to power their electrical components. Battery resources, however, are finite. Thus, when communicating data while powered by a battery source, devices should consume battery resources in the most efficient manner. Such efficient use includes balancing battery life constraints with communicating data using technology, such as multiple-input and multiple-output (MIMO) operation, which can drain battery life at a much faster rate than communicating data using non-MIMO operation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
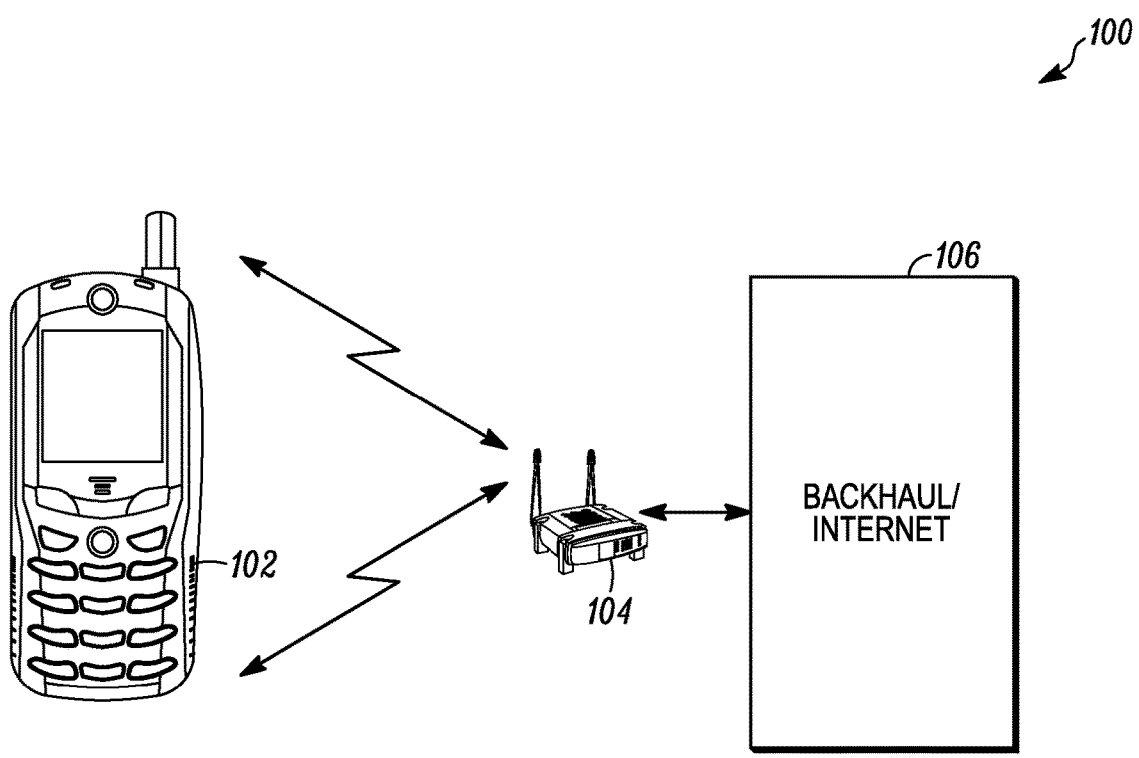
FIG. 1 is a schematic diagram of an example environment within which is implemented methods and apparatus for controlling MIMO operation in a communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, a communication device configured in accordance with the teachings herein can be used to optimize battery life by disabling and enabling multiple-input and multiple-output operation based on a set of one or more parameters that indicates quality of service for receiving and/or transmitting data to another device. For an embodiment, the set of parameters includes one or more of bit error rate, packet error rate, packet loss, packet retransmission rate, or retransmission timer results. Disabling and enabling MIMO operation includes enabling or disabling one or more transmit paths, one or more receiver paths, and/or one or more transceiver paths of the communications device.

For one embodiment, a method for controlling multiple-input and multiple-output operation in a communication device includes communicating data using multiple-input and multiple-output operation and determining a set of parameters that indicate quality of service associated with communicating the data to another device. The method also includes comparing the set of parameters to a set of thresholds and disabling the multiple-input and multiple-output operation when one or more parameters in the set of parameters exceed one or more thresholds in the set of thresholds.

In other embodiments, a method for controlling multiple-input and multiple-output operation in a communication device includes communicating data using multiple-input and multiple-output operation; determining a battery level of the communication device; and determining a data rate used in communicating the data. The method also includes determining whether the battery level is below a first battery level threshold when the data rate is a first data rate and determining whether the battery level is below a second battery level threshold when the data rate is a second data rate. The method further includes disabling the multiple-input and multiple-output operation for the first data rate when the battery level is below the first battery level threshold and disabling the multiple-input and multiple-output operation for the second data rate when the battery level is below the second battery level threshold.

Also disclosed herein is a communication device configured to control multiple-input and multiple-output operation for communicating data. The communication device includes a transceiver component configured to communicate data using multiple-input and multiple-output operation and a set of processors coupled to the transceiver component. The set of processors are configured to determine a set of parameters that indicate quality of service associated with communicating the data to another device, compare the set of parameters to a set of thresholds, and initiate disabling the multiple-input and multiple-output operation when one or more parameters in the set of parameters exceed one or more thresholds in the set of thresholds.

FIG. 1 illustrates a schematic diagram of an example environment 100 within which may be implemented methods and apparatus for controlling MIMO operation in a communication device. Environment 100 includes a communication device 102, an access point 104, and infrastructure equipment 106. In this example environment, the communication device 100 is a mobile or portable device configured to wirelessly communicate with the access point 104. Example communication devices include a smartphone, a cellular phone, a phablet, a tablet, a personal digital assistant, a mobile phone, a media player, a laptop, or another type of portable electronic device capable of capable of communicating with other devices in accordance with various aspects of the disclosed embodiments.

The access point 104 is, for example, a wireless fidelity (Wi-Fi) router that communicates with the infrastructure equipment 106, which can be for example "backhaul" for a cellular site or network that provides access to the Internet. For this example, the access point 104 and the communication device 102 are configured to operate in accordance with various Wi-Fi standards (e.g., 802.11 a, b, g, n, ac) and particularly operate in accordance with Wi-Fi standards that support MIMO technology. MIMO is a method for multiplying the capacity of a radio link using multiple transceiver paths and corresponding antennas to exploit multipath propagation for communicating data between two wireless devices. In other embodiments, the access point 104 and communication device 102 are configured to support other short range wireless technologies, such as HomeRF (Home Radio Frequency), Home NodeB (Fourth Generation Long Term Evolution (4G LTE) femtocell), Worldwide Interoperability for Microwave Access (WiMax), or any other type of short range wireless technology capable of performing MIMO communications.

In some embodiments, the access point 104 is a communication device that operates as a Mobile Hotspot or a Wi-Fi group owner. A Mobile Hotspot creates a Wi-Fi area coverage allowing nearby Wi-Fi devices to connect to the Internet via a cellular network. The backhaul 106, in such an example, is a cell site, NodeB, microcell, and the like, configured to support cellular communications of data over wireless connections using any suitable wireless technologies, such as, High-Speed Packet Access (HSPA+), WiMax, LTE, and the like. A Wi-Fi group owner functions as a Wi-Fi access point allowing other devices to connect as Wi-Fi clients. If the access point 104 operates as a Wi-Fi group owner, the backhaul 106 could be any type of Wi-Fi network (e.g., using IEEE 802.11 a, b, g, n, ac, Wi-Fi Direct, or Wi-Fi Peer-to-Peer standards) or a cellular network that allows the group owner to connect to a data network, such as the Internet. In other example scenarios, the backhaul/Internet 106 represents any intervening networks or computing components necessary to provide the access point 104 a connection with the Internet.

Both the communication device 102 and the access point 104 are configured to operate using 802.11ac high throughput (HT) bandwidths, such as HT20, HT40, HT80, and HT160. These bandwidths can be increased further by using MIMO spatial streams between the communication device 102 and the access point 104. In a MIMO system, spatial multiplexing is used to increase throughput for data transmissions by, for example, dividing a high rate data stream into multiple low rate data streams and sending each low rate data stream over the same channel using different antennas. In other words, different data streams are transmitted over the same channel using different antennas. In addition, in a MIMO system, spatial diversity is used to make data transmissions more robust or reliable.

Regardless of whether multiple paths are used to increase throughput or reliability, using MIMO to transmit data via multiple paths requires operating more than one antenna. When one antenna is used to communicate data, the electronic components of the communication device 102 forming the transceiver path associated with that antenna requires power. If more than one antenna is used, then more than one transceiver path is powered in whole or in part. The increased number of operating transceiver paths creates a greater drain on battery resources of the communication device 102. Although MIMO is capable of providing greater throughput and greater reliability, this benefit can come at the cost of greater battery consumption.

Figure 2:
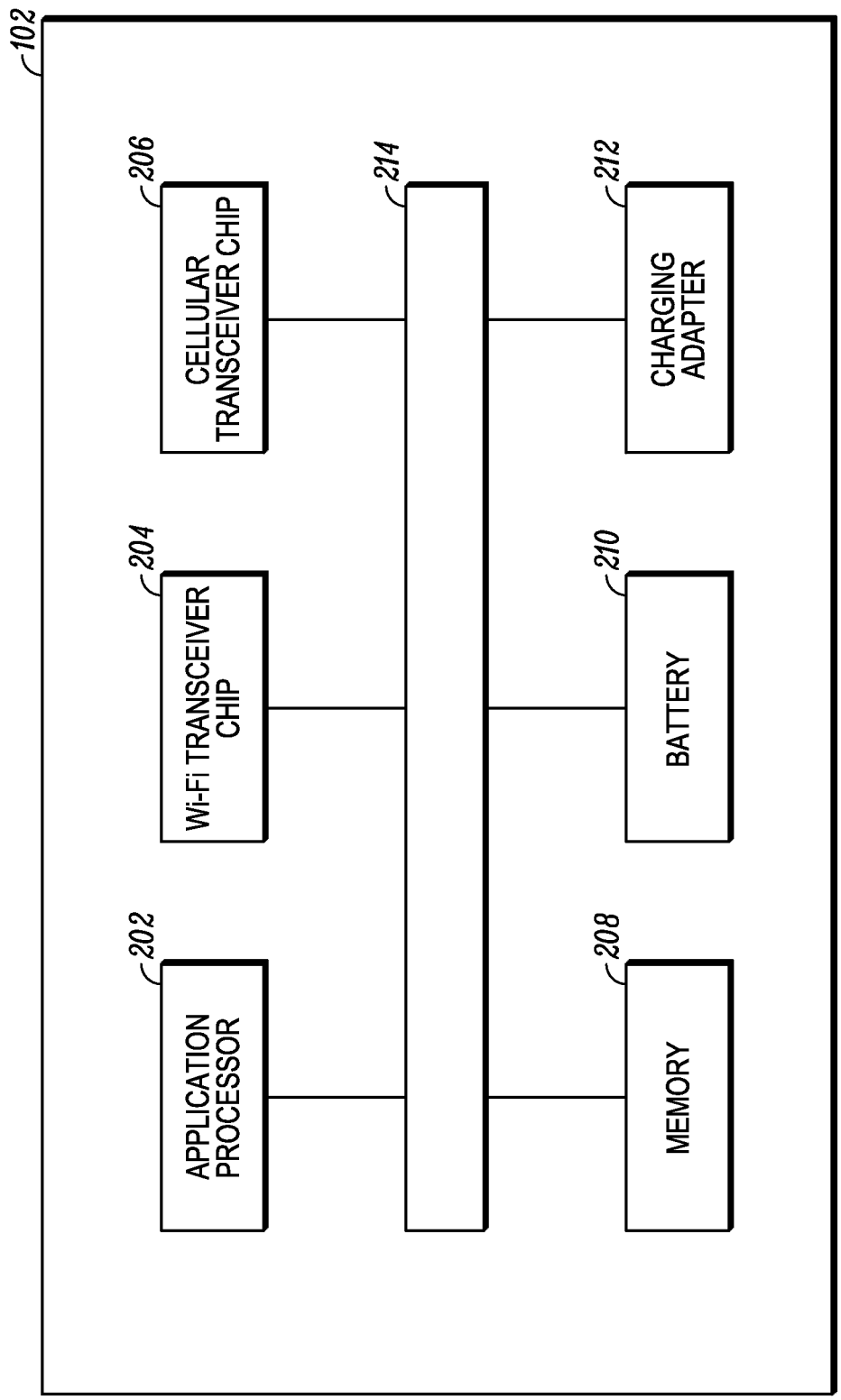
FIG. 2 is a block diagram illustrating example internal components of a communication device configured for controlling MIMO operation in accordance with some embodiments.

Referring now to FIG. 2, therein is provided a block diagram illustrating example internal hardware components of a wireless communication device, such as the communication device 102, in accordance with the present teachings. As shown in FIG. 2, the internal elements or components include an application processor 202, a Wi-Fi transceiver chip 204, a cellular transceiver chip 206, a memory component 208, a battery 210, and a charging adapter 212. As further illustrated, the internal components 200 are coupled to one another, and in communication with one another, by way of one or more internal communication links 214, for instance an internal bus and direct connections such as between the battery 210 and the charging adapter 212. A limited number of device components 202, 204, 206, 208, 210, 212, and 214 are shown for ease of illustration, but other embodiments may include a lesser or greater number of such components. Moreover, other elements needed for a commercial embodiment of a device that incorporates the components shown are omitted from FIG. 2 for clarity in describing the enclosed embodiments.

The application processor 202 provides main or core processing capabilities within the communication device 102 and, in an embodiment, serves as a primary processor which processes computer-executable instructions to control operation of the device 102. For example, the application processor 202 is implemented as a system-on-chip (SoC) that supports word processing applications, email and text messaging applications, signaling protocols, video and other image-related and/or multimedia applications, etc., executable on the communication device 102.

The Wi-Fi transceiver chip 204 is configured to conduct Wi-Fi communications in accordance with the IEEE 802.11 (e.g., a, b, g, n, or ac) standards using HT and MIMO communication techniques. In other embodiments, the Wi-Fi transceiver chip 204 instead (or in addition) conducts other types of communications commonly understood as being encompassed within Wi-Fi communications such as some types of peer-to-peer (e.g., Wi-Fi Peer-to-Peer) communications and Mobile Hotspot operations. Further, in other embodiments, the Wi-Fi transceiver chip 204 is replaced or supplemented with one or more other wireless transceivers configured for non-cellular wireless communications including, for example, wireless transceivers employing ad hoc communication technologies such as HomeRF, Home Node B (4G LTE femtocell), and/or other wireless communication technologies.

The wireless transceiver chip 206 is configured to conduct cellular communications of data over wireless connections using any suitable wireless technology, such as Third Generation (3G), 4G, LTE, etc., vis-à-vis cell towers or base stations. In other embodiments, the wireless transceiver chip 206 is configured to utilize any of a variety of other cellular-based communication technologies to conduct, for instance: analog communications (using, e.g., Advanced Mobile Phone System (AMPS)); digital communications (using, e.g., Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.); and/or next generation communications (using, e.g., Universal Mobile Telecommunication System (UMTS), Wideband CDMA (WCDMA), LTE, Institute of Electrical and Electronics Engineers (IEEE) 802.16, etc.); or variants thereof.

The memory component 208 in various embodiments can include one or more of: volatile memory elements, such as random access memory (RAM); or non-volatile memory elements, such as a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), or a Flash memory. In an embodiment, the memory component 208 includes a region of shared memory accessible to various components of the communication device 102, such as the application processor 202 and the cellular transceiver chip 206.

The internal components of the communication device 102 also include a battery 210 for providing power to the other internal components while enabling the communication device 102 to be portable. Various components of the communication device 102, such as the application processor 202 and the Wi-Fi transceiver chip 204 alone or in combination with other components, are configured to determine a level of charge remaining in the battery 210.

The charging or charge adaptor 212 regulates current from an external battery charger connected to a power source or power supply, to which the communication device 102 is attached in order to charge the battery 210 using a direct connection between the charging adapter 212 and the battery 210. This direct connection, whereby the communication device 102 is "attached" to the charging adapter 212 can include one or more of an electrical, mechanical, electromechanical, inductive, etc. connection or coupling.

The battery charger can be a "turbo charger" or a regular (non-turbo charger). A turbo charger is configured to allow higher currents and power than regular chargers to more quickly charge the battery 210, for example up to 75% percent faster using 15 Watts of power rather than the conventional 9 Watts. For a further embodiment, the charge adaptor 212 is configured to ask for various levels of direct current (DC) voltage coming from the power supply to regulate current, to a maximum amount of current draw, given the charge level of the battery 210 to, thereby, preserve the longevity of the battery 210.

Figure 3:
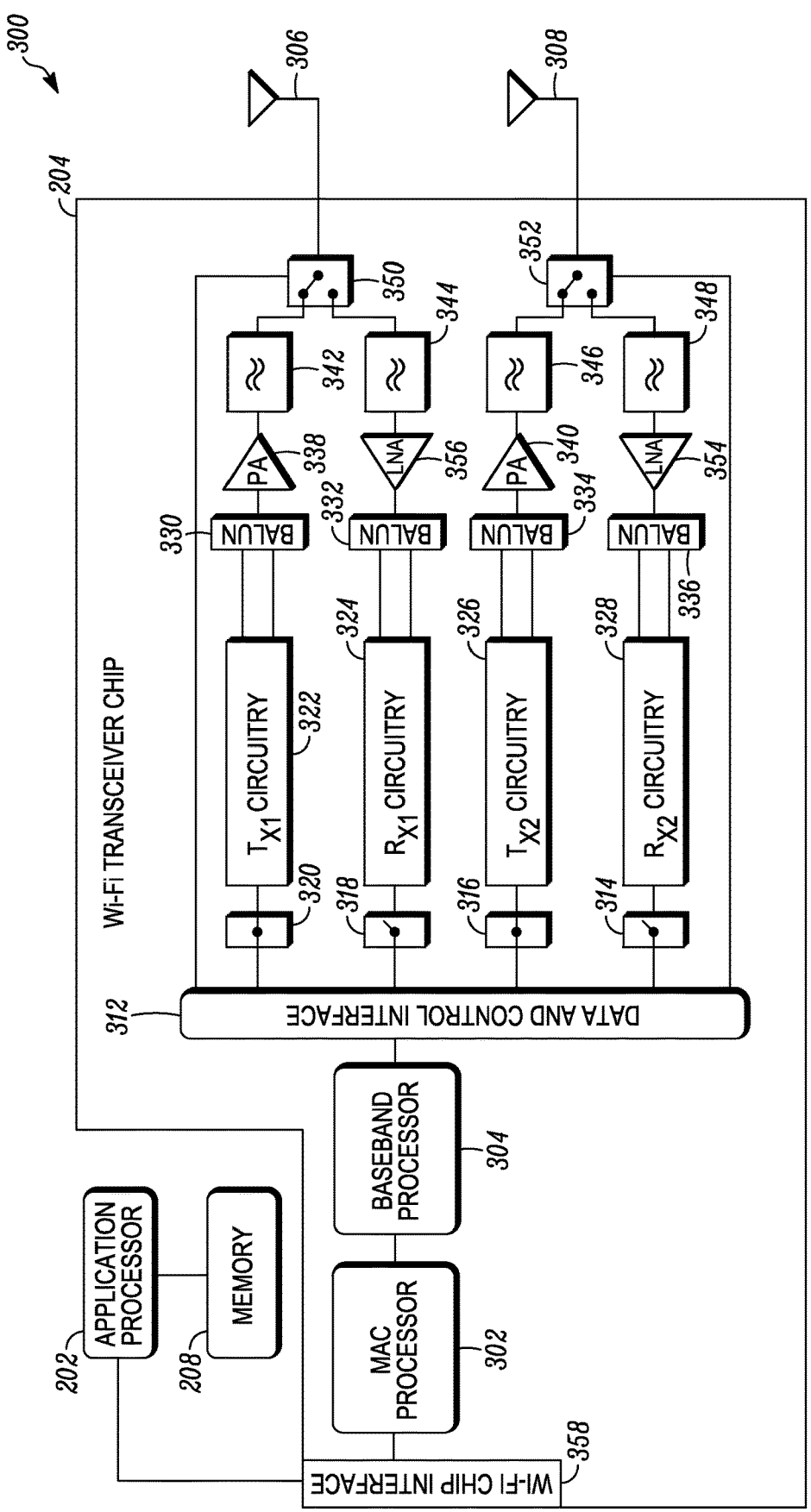
FIG. 3 is a schematic diagram of a communication device architecture configured for controlling MIMO operation in accordance with some embodiments.

FIG. 3 is a schematic diagram of various internal hardware components 300 of the communication device 102 configured to execute a variety of functions associated with MIMO operation of the communication device 102. The components 300 include the application processor 202, the memory 208 and a transceiver component. For this example, the transceiver component is the Wi-Fi transceiver (XCVR) chip 204. However, in another embodiment, the transceiver component could be the cellular transceiver chip 206. As illustrated, the Wi-Fi transceiver chip 204 includes a media access control (MAC) processor 302, a baseband processor 304, a data and control interface 312, and multiple transceiver paths that enable the MIMO operation.

As shown, each transceiver path includes a transmit path and a corresponding receive path both connected to a same antenna. For example, a first transceiver path includes a transmit (Tx) path having a switch 320, Tx1 circuitry 322, a balun 330, a power amplifier (PA) 338, and a filter 342 coupled through a duplexer 350 to an antenna 306. A corresponding receive (Rx) path of the first transceiver path includes a switch 318, Rx1 circuitry 324, a balun 332, a low noise amplifier (LNA) 356, and a filter 344 coupled through the duplexer 350 to the antenna 306. Similarly a second transceiver path includes a transmit path having a switch 316, Tx2 circuitry 326, a balun 334, a power amplifier 340, and a filter 346 coupled through a duplexer 352 to an antenna 308. A corresponding receive path of the second transceiver path includes a switch 314, Rx2 circuitry 328, a balun 336, a low noise amplifier 354, and a filter 348 coupled through the duplexer 352 to the antenna 308.

The application processor 202 is coupled to the Wi-Fi transceiver chip 204 by way of a bus (e.g., a peripheral component interconnect express or secure digital input/output bus), which communicates signals and data to various components of the chip 204 through a Wi-Fi chip interface 358. Such signals and data can include various statistics and measurements, determined by the application processor, related to the quality of the connections that the communication device 102 has established with an external device. Such statistics are also referred to herein as parameters that indicate quality of service associated with communicating data to another (external) device.

The Media Access Control MAC processor 302 performs signaling functions associated with establishing and maintaining a MAC layer connection with devices external to the communication device 102, such as the access point 104. The MAC processor 302 is also configured to track various statistics and measurements related to MAC layer operations including statistics related to the quality of the connections that the communication device 102 has established with an external device. These statistics are also referred to herein as parameters that indicate quality of service associated with communicating data to another (external) device.

The baseband processor 304 manages radio control functions, such as signal generation and encoding. Illustratively, when the communication device 102 is transmitting data, the baseband processor 304 propagates a digital baseband signal through a transmit path. The baseband signal is a signal used to modulate a carrier wave and is defined by an in-phase (I) component and a quadrature (Q) component. The I component is a zero phase cosine component, and the Q component is a phase II/2 sine component.

In an example illustration of communicating a signal through a transmit path, the baseband signal is communicated to transmit circuitry $T_{x1}$ 322. The transmit circuitry 322 include elements not pictured such as: digital to analog converters to convert the baseband signals from digital to analog form; baseband filters to remove harmonic distortions and alias components in the baseband signals; and IQ modulators, also referred to in the art as frequency mixers and multipliers, to mix the baseband signals with in-phase and quadrature carrier signals of a carrier signal having a carrier frequency constructed using a local oscillator to up-convert the baseband signal to a higher frequency modulated radio frequency signal in differential form.

The I and Q components of the RF signal are communicated to the balun 330, which converts the I and Q signal components from differential to single ended form. Power amplifier 338 provides an additional power gain stage to the signal, and the filter 342 filters frequencies outside the transmit band. In response to signals from a data and control interface 312, the duplexer 350 is configured to connect the filter 342 to the antenna 306. The antenna 306 radiates the signal for reception by another device, such as, the access point 104.

When the communication device 102 receives a signal, the data and control interface 312 controls the duplexer 350 to connect the filter 344 to the antenna 306. The antenna 306 then propagates the signal to filter 344 which filters frequencies outside the receive band. The LNA 356 amplifies the signal and propagates the amplified signal to balun 332. The balun 332 converts the signal into I and Q components which are passed to the receive circuitry 324. The receive circuitry 324 down-converts the RF signal to its I and Q baseband components in a process that is reverse to the process described in relation to transmit circuitry 322, using an IQ demodulator, baseband filter, and analog to digital converter (ADC). The signal is then passed to the baseband processor 304. The resultant signal is transmitted to the MAC processor 302 and/or the application processor 202 for further processing. Similarly, the components 312, 316, 326, 334, 340, 346, and 352 are configured to transmit a signal using antenna 308. The antenna 308 is also configured to receive a signal and propagate the signal to the baseband processor 304 via the components 352, 348, 354, 336, 328, 314 and 312.

Although this embodiment illustrates the transceiver chip 204 with two transceiver paths (e.g., MIMO 2×2) each having a transmit path and a corresponding receive path, in other embodiments the Wi-Fi transceiver chip 204 is configured with more than two transceiver paths. For one alternative embodiment, chip 204 includes four transceiver paths to enable MIMO 4×4 operation. Moreover, the embodiment shown in FIG. 3 supports 5 GHz operations. However, additional components can be added to simultaneously support 2.4 GHz operations. For example, for each Rx path, 2.4 GHz operation would have separate a LNA and IQ demodulator. However, the baseband filter and ADCs may be shared with 5 GHz Rx. For each Tx chain, 2.4 GHz operation would have a separate IQ modulator and PA. The filter and DACs could be shared with the 5 GHz Tx. Additionally, externally each path would have a Diplexer to combine the 2.4 GHz and 5 GHz operations to a single antenna, if a shared antenna is used, as is the case for many smartphones.

Components of the first and second transceiver paths drain energy from the battery 210. Accordingly, there may be scenarios where the multi-path advantages of MIMO are not worth the extra drain on the battery required to fully operate all the transceiver paths of the communication device 102. For example, if the communication device 102 is operating in an unstable RF environment there may be instances when the quality of service is low. An unstable wireless connection in the downlink (e.g., transmissions from the access point 104 to the communication device 102) results in a high bit error rate (BER), a high packet error rate (PER), and/or a high packet loss which leads to a low quality of service. An unstable connection in the uplink direction can lead to an inordinate number of packet retransmissions at the MAC and/or network layer, large retransmission timer results for collision avoidance, or a higher PER.

A set of one or more processors (for example, the MAC processor 302 and/or the application processor 202) of the communication device 102 are coupled to the Wi-Fi transceiver chip 204 and configured to determine a set of parameters that indicate the quality of service associated with communicating data to another device, such as the access point 104. In the uplink direction, the set of parameters illustratively includes one or a combination of BER, PER, and packet loss. In the downlink direction, the set of parameters includes one or a combination of packet retransmission rate, Tx PER, and retransmission timer results.

In accordance with the prior art, when the quality of service is low, for example when one or more of these corresponding parameters exceeds a threshold, MIMO is enabled to use multi-path communications for greater reliability. Using MIMO, however, creates a greater battery drain. When the link between the communication device 102 and access point 104 is unstable, the communication redundancy that MIMO provides may not provide a quality of service that is worth the current drain needed to power multiple transceiver paths. In such scenarios, disablement of MIMO in accordance with embodiments described herein can provide for a more efficient usage of battery power.

When a transceiver path or MIMO operations in general of the communication device 102 is "disabled", one or more components of the transceiver path(s) is disabled or prevented from operating, and/or power to one or more transceiver paths of the communication device 102 is reduced in whole (e.g., disconnected) or part. A partial or a full disabling of a transceiver path or of MIMO operation in general, thereby, partially or fully reduces the power consumed by the transceiver path(s). Likewise, the term "enable" includes both a partial and a full enabling of a transceiver path or of MIMO operation in general.

For one embodiment, a full disabling of MIMO operation means using a single transceiver path at a time to both transmit and receive data. By contrast, partial disabling of MIMO operation means only some MIMO functionality is disabled. For one example, the MIMO operation is reduced from MIMO 4×4 to MIMO 2×2. In another example, downlink communications on a receive path are carried out using MIMO operation, while corresponding uplink communications on a transmit path are carried out using non-MIMO communications. Thus, a transmit path of at least one transceiver path is disabled while the receive path remains enabled. For yet another example, uplink communications on a transmit path are carried out using MIMO operation, while corresponding downlink communications on a receive path are carried out using non-MIMO communications. Thus, a receive path of at least one transceiver path is disabled while the transmit path remains enabled. For another embodiment, MIMO operation is disabled for some data rates but not for others.

Figure 4:
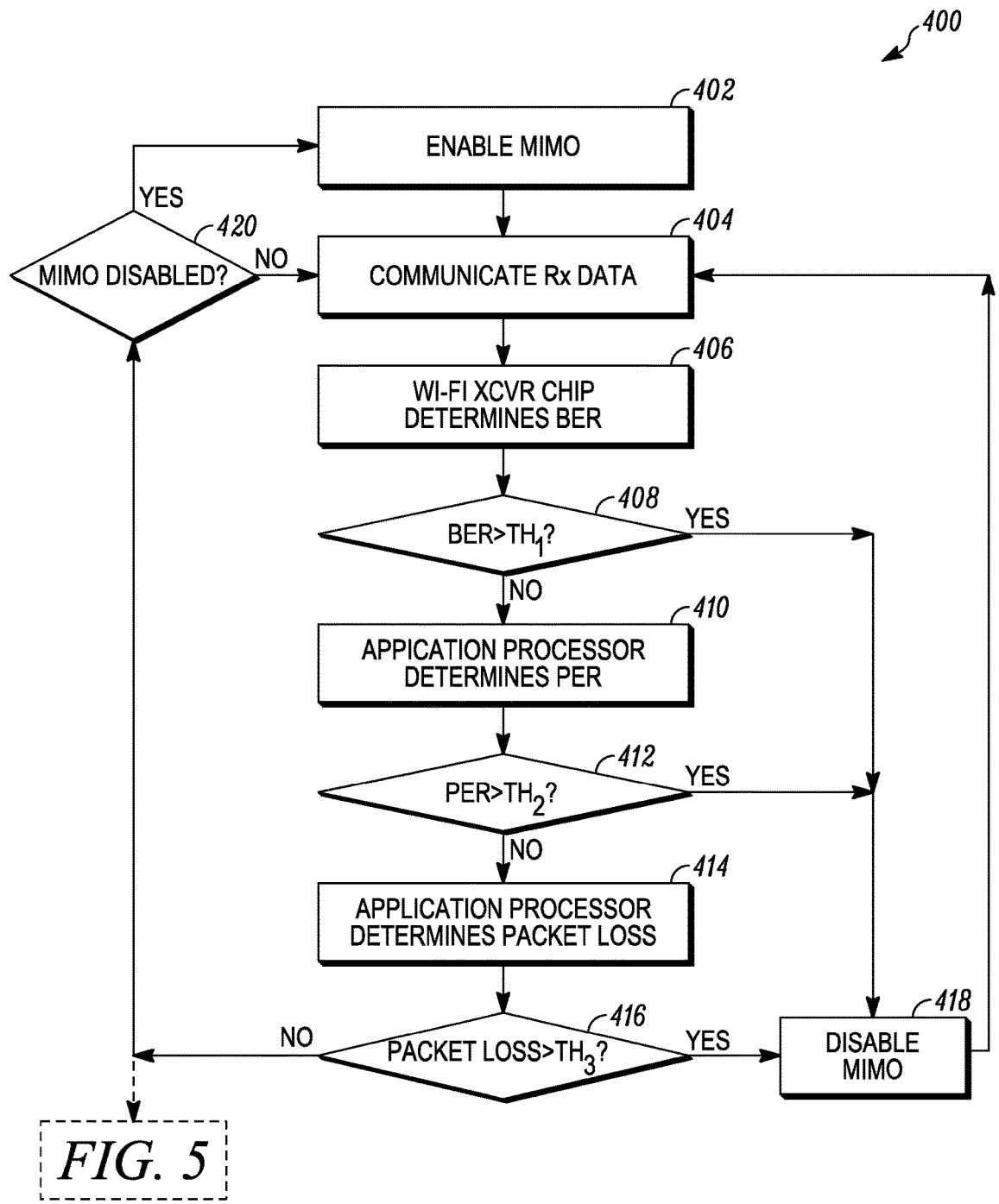
FIG. 4 is a flow diagram illustrating an embodiment of a method for controlling MIMO operation in a communication device based on parameters that indicate quality of service when receiving data.

FIG. 4 shows one example method 400 for controlling MIMO operations in a communication device, e.g., device 102, based on quality of service parameters associated with receiving data from another device in accordance with the present teachings. For instance, the communication device 102 is in a state where it is enabled 402 for MIMO operation. In this example, when MIMO is enabled, both transceiver paths are connected to the baseband processor using switches 320, 318, 316, and 314 to transmit and receive data. When the device 102 receives 404 data, the MAC processor 302 determines 406 the BER as a first parameter of the set of parameters that indicate quality of service. The BER is the bit error per unit time, where a bit error occurs when a bit of a data stream transmitted over a communication channel has been altered due to noise, interference, distortion or bit synchronization errors. The MAC processor 302 compares 408 the measured BER with a bit error rate threshold ($TH_1$). If the BER is greater than $TH_1$, the MAC processor 302 initiates 418 disabling MIMO.

In some implementations, to initiate disabling MIMO, the media access control processor 302 communicates a signal via the baseband processor 304 to the data and control interface 312 which responsively disables, in whole or part, at least one transceiver path of the multiple transceiver paths of the communication device 102. In this example, the communication device 102 has two transceiver paths, so fully disabling MIMO operation includes disabling one transceiver path leaving the device 102 using the one remaining enabled transceiver path to communicate data. By contrast, partially disabling MIMO means disabling only the receive path of one of the transceiver paths and leaving the corresponding transmit path enabled.

If the BER is less than $TH_1$, the application processor 202 determines 410 the PER. The PER is a ratio of the number of incorrectly received packets to correctly received packets. A packet is incorrect if at least one bit of the packet is erroneous. The PER is compared 412 with a packet error rate threshold ($TH_2$). If the PER is greater than $TH_2$, the application processor 202 initiates disabling 418 of MIMO operations. To initiate disabling of MIMO operations, the application processor 202 illustratively communicates a signal to the data and control interface 312 via the processors 302, 304, and the data and control interface 312 responsively powers down components of the disabled transmit and/or receive path.

If the PER is less than $TH_2$, the application processor 202 determines 414 packet loss. Packet loss occurs when one or more packets travelling through a network fails to reach its destination. Packet loss is detected, for example, when the application processor 202 determines that a packet in a sequence of packets is missing. The packet loss is compared 416 with a packet loss threshold ($TH_3$). If the packet loss is greater than $TH_3$, then the application processor 202 initiates disabling 418 MIMO operation. In one embodiment, at least one processor of the set of processors is configured to initiate disabling 418 MIMO operation by initiating disabling of a receive path when one more parameters of BER, PER, or packet loss exceeds a corresponding threshold in the set of thresholds.

After MIMO is disabled 418, the communication device 102 continues to receive 404 data. As the communication device 102 engages in data communications the set of processors continue to determine whether any parameters in the set of parameters exceeds the one or more thresholds in the set of thresholds (e.g., the determinations at 408, 412, and 416). If none of the parameters exceeds the one or more thresholds and MIMO is disabled 420, then MIMO operation is re-enabled 402. Re-enabling MIMO 402 includes re-enabling one or more transmit or receive paths that were previously disabled. If none of the parameters exceeds their respective threshold and MIMO operation is not disabled 420, the communication device 102 continues to receive 404 data. Alternatively, if none of the parameters exceeds their respective threshold, the method continues to FIG. 5.

Figure 5:
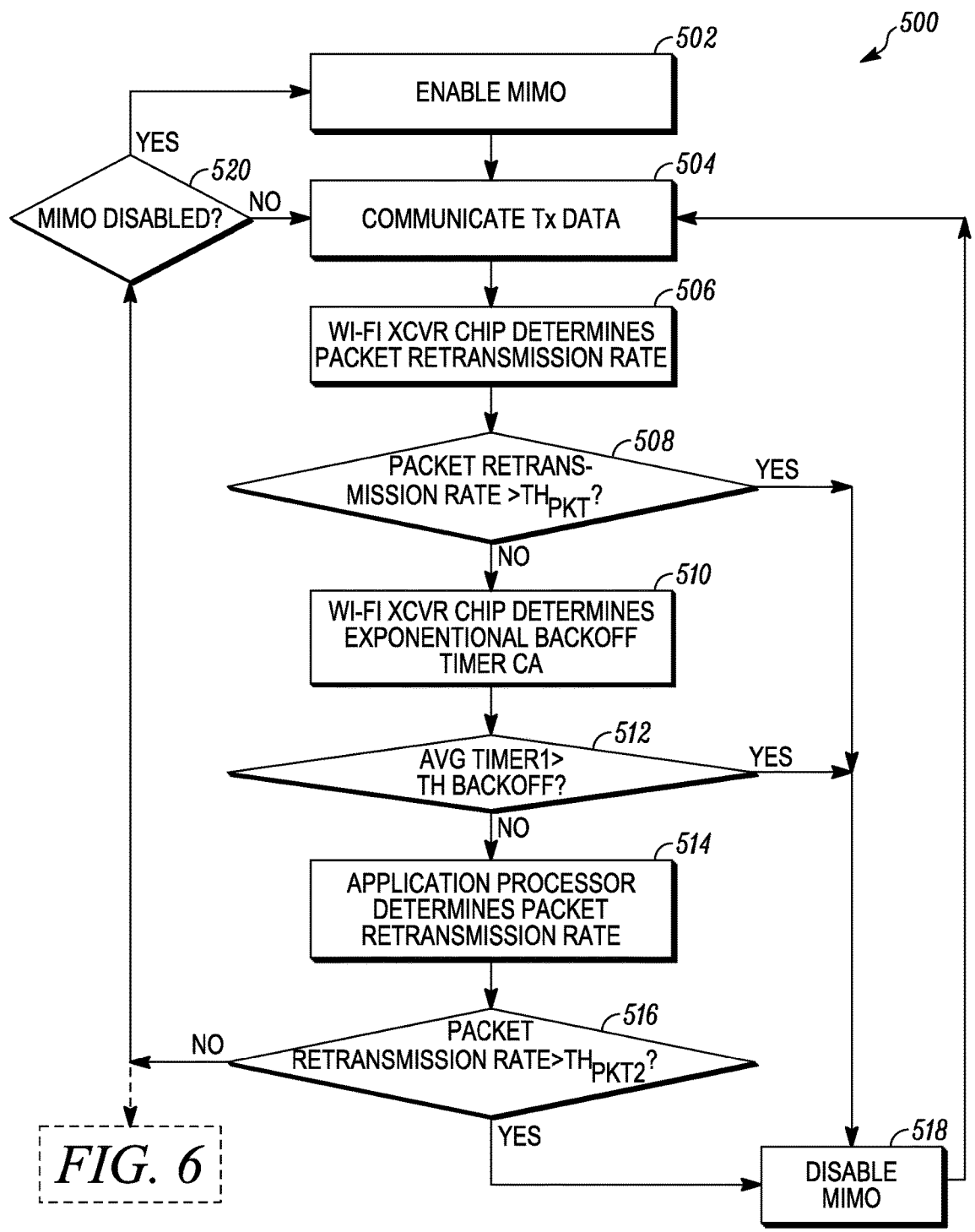
FIG. 5 is a flow diagram illustrating an embodiment of a method for controlling MIMO operation in a communication device based on parameters that indicate quality of service when transmitting data.

The parameters determined in the method 400 are associated with a quality of service as relates to downlink communications. In the uplink, parameters such as packet retransmission rate, retransmission timer results, and PER indicate a quality of service associated with communicating uplink data. FIG. 5 illustrates a flow diagram of an embodiment of a method 500 for controlling MIMO operation in a communication device, such as the communication device 102, in accordance with quality of service that is based on one or a combination of a packet retransmission rate, a retransmission timer result, or a PER.

For instance, the communication device 102 is in a state where it is enabled for MIMO operation 502. When the device 102 is transmitting 504 data, the MAC processor 302 of the Wi-Fi transceiver chip 204 determines 506 a packet retransmission rate at the MAC layer as a parameter of the set of parameters which indicate quality of service. A packet retransmission occurs when the communication of a data packet goes unacknowledged by the intended recipient of the packet. The packet retransmission rate is a measure of retransmissions that occur per unit time. The MAC processor 302 compares 508 the packet retransmission rate to a packet retransmission rate threshold ($TH_{pkt}$) and disables 518 MIMO operation if the packet retransmission rate is greater than $TH_{pkt}$.

If the packet retransmission rate is not greater (e.g., is less than) than $TH_{pkt}$, the MAC processor 302 determines 510 the retransmission timer result and compares 512 the retransmission timer result with a timer threshold ($TH_{backoff}$). The retransmission timer results or exponential backoff timer is a timer used to space out transmissions of multiple devices on a shared channel. If the communication device 102 is trying to transmit a packet and another device is trying to simultaneously transmit on the same channel, the communication device 102 sets a timer to transmit at a later time. The length of this timer is randomly selected in the hopes of avoiding another collision when retransmitting. If another collision occurs, the length of the retransmission timer increases. The timer is increased until a transmission can be completed without a collision. If the retransmission timer result is greater than $TH_{backoff}$, the MAC processor 302 disables 518 MIMO operation.

In the above implementation, the timer result represents the value of the retransmission timer, which is compared to a timer threshold to determine whether to disable MIMO. However, variations can be implemented. For one example implementation, the timer result represents a running average for the retransmission timer over a timeframe, which is compared to the timer threshold to determine whether to disable MIMO. For another example implementation, MIMO is disabled when the retransmission timer or the running average thereof exceeds the timer threshold a certain number of times within a timeframe.

Returning to block 512, if the retransmission timer result is not greater than $TH_{backoff}$, the application processor 302 determines 514 a retransmission rate of packets occurring, for example, at layer 2 (e.g., MAC layer) and/or layer 4 (e.g., transmission control protocol or user datagram protocol). The application processor 202 compares 516 the retransmission rate to a second retransmission threshold ($TH_{pkt2}$) and disables 518 MIMO operation when the retransmission rate is greater than $TH_{pkt2}$.

For example, when disabling 518 MIMO the application processor 302 disables one transmit path (e.g., the transmit path of the first transceiver path) while leaving active the corresponding receive path (e.g., the receive path of the first transceiver path). In other example embodiments, either the MAC processor 302 or the application processor 202 or both is configured to initiate disabling 518 of a transmit path of the communication device 102 when at least one of the packet retransmission rate or retransmission timer results exceeds a corresponding threshold in the set of thresholds, in this example using the determinations at 508, 512, and 516.

After MIMO is disabled 518, the communication device 102 continues to transmit 504 data. As the communication device 102 engages in data communications the set of processors continue to determine whether any parameters in the set of parameters exceeds the one or more thresholds in the set of thresholds (e.g., the determinations at 508, 512, and 516). If none of the parameters exceeds the one or more thresholds and MIMO is disabled 520, then MIMO operation is re-enabled 502. Re-enabling 502 MIMO includes re-enabling one or more transmit or receive paths that were previously disabled. If none of the parameters exceeds their respective threshold and MIMO operation is not disabled 520, the communication device 102 continues to transmit 504 data. Alternatively, if none of the parameters exceeds their respective threshold, the method continues to FIG. 6.

Although the methods of 400 and 500 are illustrated as separate methods which are performed sequentially with method 400 performed before method 500, in other embodiments the method 500 is performed before method 400. In still other embodiments, the methods 400, 500 are performed simultaneously with one or more of the set of processors performing aspects of one method and switching to perform aspects of the other method. Moreover, in some implementations of the methods 400, 500, the order of determining the BER, PER, packet loss, and retransmission results differs. According to some embodiments, determining the set of parameters that indicates a quality of service and comparing the parameters to a set of thresholds includes at least two of: determining BER and comparing the BER to $TH_1$; determining PER and comparing the PER to $TH_2$; determining packet loss and comparing the packet loss to $TH_3$; determining packet retransmission rate and comparing the packet retransmission rate to $TH_{pkt}$ and/or $TH_{pkt2}$; or determining retransmission timer results (or the runnning average thereof) and comparing the retransmission timer results (or the runnning average thereof) to $TH_{backoff}$. MIMO is disabled if at least two of: the BER exceeds $TH_1$; the PER exceeds $TH_2$; the packet loss exceeds $TH_3$; the packet retransmission rate exceeds $TH_{pkt}$ or $TH_{pkt2}$; or the retransmission timer results (or the runnning average thereof) exceeds $TH_{backoff}$ either once or a certain number of times over a given timeframe.

The methods 400 and 500 address scenarios related to determining whether a data link provides such poor quality of service that the increase in reliability is not worth the battery drain of multi-path communications. In other scenarios, the increase in the throughput that MIMO provides does not outweigh the battery drain needed to operate in MIMO mode. In other words, depending on how much charge remains in the battery, the gain in throughput may not outweigh the risk of completely draining the battery and rendering the communication device unable to communicate using data or voice.

Figure 6:
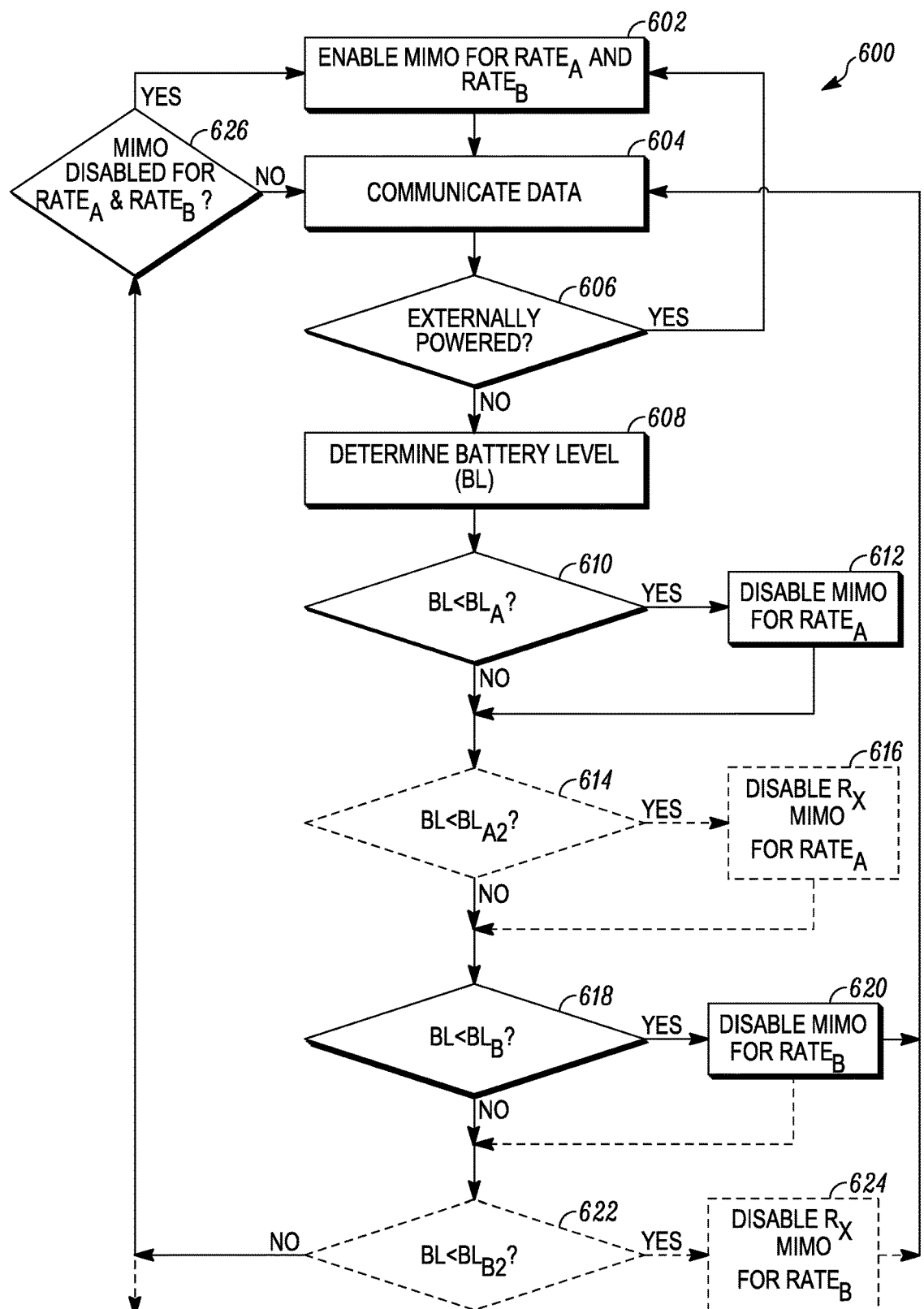
FIG. 6 is a flow diagram illustrating an embodiment of a method for controlling MIMO operation in a communication device based on battery level and data rate.

FIG. 6 illustrates a method 600 of determining MIMO efficiency and controlling MIMO operation in a communication device, such as the communication device 102 having the two transceiver paths, based on battery level and data rate in accordance with the present teachings. Initially, at 602, the communication device 102 has MIMO operation enabled to communicate 604 data for at least two different data rates, in this case $Rate_A$ and $Rate_B$. In this example embodiment, $Rate_A$ is lower than $Rate_B$. Illustratively, $Rate_A$ supports one of 802.11 HT40 or 802.11 HT20, and $Rate_B$ supports 802.11 HT80. In other embodiments, $Rate_A$ and $Rate_B$ can be any rates associated with 802.11ac, such as HT20, HT40, HT80, HT160, etc. In still other embodiments, $Rate_A$ is not lower than $Rate_B$ and/or the rates are associated with one or more other wireless technologies capable of supporting MIMO communications, such as, HSPA+, WiMax, LTE, and the like.

Further to the embodiment shown by reference to FIG. 6, the communication device 102 is configured such that the user can operate the device while a charging adapter 212 is engaged. Particularly, when the device 102 is receiving external power through the adapter 212, the device 102 can in some scenarios perform MIMO communications without concern for the extra battery drain caused by enabling multiple transceiver paths. Accordingly, a processor (e.g., the application processor 202) from the set of processors 202, 302, 304 determines 606 whether the communication device 102 is externally powered. If the adapter 212 is connected, MIMO operation continues to be enabled 602 for $Rates_{A\&B}$ so that the communication device 102 can, thereby, continue to communicate 604 data using MIMO operation at both data rates while the communication device 102 is externally powered.

If the device 102 is not externally powered, one of processors determines 608 a battery level (BL) at which the device 102 is currently operating. For instance, the BL corresponds to an amount charge remaining in the battery 210. The BL is compared to one or more battery level thresholds for a given data rate. Using the comparison, MIMO operation can be gradually disabled and later re-enabled based on the detected 808 battery level of the communication device 102.

For a first embodiment, the BL is compared against two battery level thresholds, $BL_A$ for $Rate_A$ and $BL_B$ for $Rate_B$, at decision blocks 610 and 618. For this first embodiment, we'll assume that for $Rate_A$ and $Rate_B$, empirical evidence shows that MIMO operation at the lower data rate $Rate_A$ produces a higher battery drain than MIMO operation at the higher data rate $Rate_B$. Therefore, threshold $BL_A$ for $Rate_A$ is set higher than threshold $BL_B$ for $Rate_B$ so that MIMO operation for $Rate_A$ is disabled before MIMO operation for $Rate_B$. The result of the comparisons 610 and 618 of the BL to the battery level thresholds $BL_A$ and $BL_B$, respectively, is evaluated to determine when and how to disable MIMO. More particularly, when the BL falls below $BL_A$ but still exceeds $BL_B$, the communication device 102 disables 612 MIMO operation for $Rate_A$ but continues to enable MIMO operation for $Rate_B$.

The method 600 then continues toward block 626, where the communication device 102 determines for which data rates MIMO operation is disabled. Since MIMO operation is still enabled for $Rate_B$, the communication device 102 communicates 604 data using non-MIMO operation for $Rate_A$ and using MIMO operation for $Rate_B$. This manner of operation continues until the measured BL falls below $BL_B$. At such time, the communication device 102 also disables 620 MIMO operation for $Rate_B$.

The method 600 continues to block 604 where the communication device 102 communicates data using non-MIMO operation until a change or event occurs such that MIMO operation is re-enabled. For one example, the user attaches the communication device 102 to the charging adapter 212. In that case, the decision block 606 leads the communication device 102 to again enable 602 MIMO operation for both data rates. When the communication device 102 is no longer externally powered, method 600 continues toward block 608 to determine the battery level and to determine whether and when to disable MIMO operation for one or both data rates based on the determined battery level.

For the first embodiment, MIMO operation was disabled completely for a particular data rate when the measured battery level fell below the corresponding battery level threshold for that data rate. However, for a second embodiment, the device 102 performs method 600 to a finer granularity to gradually disable MIMO operation for each data rate. For instance, let's assume that empirical evidence shows that it takes more power to transmit during MIMO operation than to receive during MIMO operation of the communication device 102. Accordingly, as battery level declines, the communication device 102 could first disable a MIMO transmit path for a given data rate and then disable the corresponding MIMO receive path.

Therefore, four battery level thresholds are set, two for $Rate_A$ (e.g., $BL_A$ and $BL_{A2}$) and two for $Rate_B$ (e.g., $BL_B$ and $BL_{B2}$), where $BL_A > BL_{A2} > BL_B > BL_{B2}$. For $Rate_A$, $BL_A$ controls disabling the transmit path of one of the transceiver paths, and $BL_{A2}$ controls disabling the corresponding receive path of that transceiver path. For $Rate_B$, $BL_B$ controls disabling the transmit path of one of the transceiver paths, and $BL_{B2}$ controls disabling the corresponding receive path of that transceiver path.

Applying method 600 for the second embodiment, at some instance in time MIMO operation might be fully enabled 602 for both data $Rate_A$ and $Rate_B$, such that the communication device 102 can communicate 604 data using MIMO operation for both data rates. When the communication device 102 determines 606 that it is powered by its internal battery source, it monitors 608 the battery level and compares the BL to the four data rates at decision blocks 610, 614, 618, 622. Presumably using the internal battery 210, the BL of the device 102 will continue to decline over time and operation.

When the BL falls below $BL_A$, device 102 disables MIMO transmissions at block 612 for $Rate_A$. When the BL falls below $BL_{A2}$, device 102 disables MIMO receptions at block 616 for $Rate_A$. When the BL falls below $BL_B$, device 102 disables MIMO transmissions at block 620 for $Rate_B$. When the BL finally falls below $BL_{B2}$, device 102 disables MIMO receptions at block 624 for $Rate_B$. With MIMO operation completely disabled for both data rates, the communication device communicates 604 data using non-MIMO operation. Method 600 can continue to repeat. Alternatively, the device 102 performs another method, e.g., method 400 of FIG. 4 or method 500 of FIG. 5, to determine whether there is another parameter that would point toward efficient MIMO operation.

More particularly, returning to FIGS. 4 and 5 and looking briefly at FIGS. 4, 5, and 6. When executing the method 400 or method 500, if none of the parameters in the set of parameters exceeds the one or more thresholds in the set of thresholds, in some example embodiments the method 600 of FIG. 6 is executed. When none of the parameters in the set of parameters exceeds the one or more thresholds, the method 400 and 500 further include determining the BL of the communication device 102 and a data rate at which the device 102 is communicating data. Further, if the BL is less than a first battery level (i.e., $BL_A$ or $BL_{A2}$) when the data rate is $Rate_A$, MIMO is disabled for $Rate_A$. If the BL is below a second battery level (i.e., $BL_B$ or $BL_{B2}$) when the data rate is $Rate_B$, MIMO is disabled for operation of $Rate_B$.

When executing the method 600 of FIG. 6, if the device 102 is communicating with MIMO enabled and the device 102 is not communicating at $Rate_A$ when BL is less than $BL_A$ or communicating at $Rate_B$ when BL is below $BL_B$, the method 400 of FIG. 4 and/or the method 500 of FIG. 5 are sequentially or simultaneously executed. In this scenario, the method 600 further includes determining a set of parameters that indicate quality of service associated with communicating data when BL exceeds $BL_A$ and $BL_B$. The set of parameters is compared to a set of thresholds and MIMO is disabled when one or more parameters in the set of parameters exceed one or more thresholds in the set of thresholds.

Determining the set of parameters that indicate quality of service and comparing the parameters against a set of thresholds includes determining the BER and comparing the BER to $TH_1$, determining the PER and comparing the PER to $TH_2$, determining packet loss and comparing the packet loss to $TH_3$, determining packet retransmission rate and comparing the packet retransmission rate to $TH_{pkt}$ and/or $TH_{pkt2}$, or determining retransmission timer results and comparing the retransmission timer results to $TH_{backoff}$. The MIMO operation is disabled when at least one of the BER exceeds $TH_1$, the PER exceeds $TH_2$, the packet loss exceeds $TH_3$, the packet retransmission rate exceeds $TH_{pkt}$ and/or $TH_{pkt2}$, or the retransmission timer results exceed $TH_{backoff}$.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

The term "coupled" as used herein is defined as directly or indirectly connected, mechanically, electrically, inductively, or otherwise. Moreover, in some instances coupled may also mean included within. For example, the MAC processor 302 being "coupled" to the Wi-Fi transceiver chip 204 can mean that the MAC processor 302 is included as a component on the chip 204.

A device or structure that is "configured" in a certain way is configured in at least that way, but may also be configured in ways that are not listed. As used herein, the terms "configured to", "configured with", "arranged to", "arranged with", "capable of" and any like or similar terms mean that hardware elements of the device or structure are at least physically arranged, connected, and or coupled to enable the device or structure to function as intended.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for controlling multiple-input and multiple-output operation in a communication device, the method comprising:
    communicating data from the communication device to a second device using multiple-input and multiple-output operation, using both a first data rate and a second data rate at the same time, wherein the first data rate supports one of 802.11 HT40 or 802.11 HT20, and the second data rate supports 802.11 HT80;
    determining a set of parameters that indicate quality of service associated with communicating the data to the second device;
    comparing the set of parameters to a set of thresholds; and
    when one or more parameters in the set of parameters exceed one or more thresholds in the set of thresholds:
        disabling communication via the first data rate; and
        communicating the data using the multiple-input and multiple-output operation, using the second data rate; and
    when none of the parameters in the set of parameters exceeds the one or more thresholds in the set of thresholds:
        determining a battery level of the communication device;
        determining whether the battery level is below a first battery level threshold corresponding to the first data rate;
        determining whether the battery level is below a second battery level threshold corresponding to the second data rate;
        disabling communication via the first data rate when the battery level is below the first battery level threshold; and
        disabling communication via the second data rate when the battery level is below the second battery level threshold.

2. The method of claim 1, wherein:
    the determining and comparing comprises determining bit error rate and comparing the bit error rate to a bit error rate threshold; and
    the communication is disabled for the first data rate when the bit error rate exceeds the bit error rate threshold.

3. The method of claim 1, wherein:
    the determining and comparing comprises determining packet error rate and comparing the packet error rate to a packet error rate threshold; and
    the communication is disabled for the first data rate when the packet error rate exceeds the packet error rate threshold.

4. The method of claim 1, wherein:
    the determining and comparing comprises determining packet loss and comparing the packet loss to a packet loss threshold; and
    the communication is disabled for the first data rate when the packet loss exceeds the packet loss threshold.

5. The method of claim 1, wherein:
    the determining and comparing comprises determining packet retransmission rate and comparing the packet retransmission rate to a packet retransmission rate threshold; and
    the communication is disabled for the first data rate when the packet retransmission rate exceeds the packet retransmission rate threshold.

6. The method of claim 1, wherein:
    the determining and comparing comprises determining retransmission timer results and comparing the retransmission timer results to a timer threshold; and
    the communication is disabled for the first data rate when the retransmission timer results exceed the timer threshold.

7. The method of claim 1, wherein:
    the determining and comparing comprises at least two of:
        determining bit error rate and comparing the bit error rate to a bit error rate threshold;
        determining packet error rate and comparing the packet error rate to a packet error rate threshold;
        determining packet loss and comparing the packet loss to a packet loss threshold;
        determining packet retransmission rate and comparing the packet retransmission rate to a packet retransmission rate threshold; or
        determining retransmission timer results and comparing the retransmission timer results to a timer threshold; and
    the communication is disabled for the first data rate when at least two of:
        the bit error rate exceeds the bit error rate threshold;
        the packet error rate exceeds the packet error rate threshold;
        the packet loss exceeds the packet loss threshold;
        the packet retransmission rate exceeds the packet retransmission rate threshold; or
        the retransmission timer results exceed the timer threshold.

8. The method of claim 1, wherein the communication device comprises multiple transceiver paths each having a transmit path and a corresponding receive path, and wherein disabling the communication via the first data rate comprises disabling the transmit path of each of the multiple transceiver paths.

9. The method of claim 1, wherein the first data rate is lower than the second data rate, and the first battery level threshold is higher than the second battery level threshold.

10. The method of claim 1 further comprising:
 determining whether the communication device is externally powered, and
 continuing to communicate the data using the multiple-input multiple-output operation while the communication device is externally powered.

11. The method of claim 1 further comprising, when the battery level exceeds the first and second battery level thresholds:
 determining a set of parameters that indicate quality of service associated with communicating the data to the other device;
 comparing the set of parameters to a set of thresholds; and
 disabling the communication via the first data rate when one or more parameters in the set of parameters exceed one or more thresholds in the set of thresholds.

12. The method of claim 11, wherein:
 the determining and comparing comprises at least one of:
  determining bit error rate and comparing the bit error rate to a bit error rate threshold;
  determining packet error rate and comparing the packet error rate to a packet error rate threshold;
  determining packet loss and comparing the packet loss to a packet loss threshold;
  determining packet retransmission rate and comparing the packet retransmission rate to a packet retransmission rate threshold; or
  determining retransmission timer results and comparing the retransmission timer results to a timer threshold; and
 the communication via the first data rate is disabled when at least one of:
  the bit error rate exceeds the bit error rate threshold;
  the packet error rate exceeds the packet error rate threshold;
  the packet loss exceeds the packet loss threshold;
  the packet retransmission rate exceeds the packet retransmission rate threshold; or
  the retransmission timer results exceed the timer threshold.

13. The method of claim 8, wherein disabling the communication via the first data rate comprises disabling a receive path of each of the multiple transceiver paths.

14. The method of claim 1, wherein the second device comprises a wireless access point.

15. A communication device configured to control multiple-input and multiple-output operation for communicating data, the communication device comprising:
 a transceiver component configured to communicate data to a second device using multiple-input and multiple-output operation, using both a first data rate and a second data rate at the same time, wherein the first data rate supports one of 802.11 HT40 or 802.11 HT20, and the second data rate supports 802.11 HT80;
 a set of processors coupled to the transceiver component and configured to:
  determine a set of parameters that indicate quality of service associated with communicating the data to the second device;
  compare the set of parameters to a set of thresholds; and
  when one or more parameters in the set of parameters exceed one or more thresholds in the set of thresholds:
   initiate disabling communication via the first data rate; and
   continue communicating the data using the multiple-input and multiple-output operation, using the second data rate; and
  when none of the parameters in the set of parameters exceeds the one or more thresholds in the set of thresholds:
   determine a battery level of the communication device;
   determine whether the battery level is below a first battery level threshold corresponding to the first data rate;
   determine whether the battery level is below a second battery level threshold corresponding to the second data rate;
   initiate disabling communication via the first data rate when the battery level is below the first battery level threshold; and
   initiate disabling communication via the second data rate when the battery level is below the second battery level threshold.

16. The communication device of claim 15, wherein the set of processors comprises at least one processor configured to initiate disabling the communication via the first data rate by initiating disabling of a transmit path when the one or more parameters includes at least one of packet retransmission rate or retransmission timer results that exceeds a corresponding threshold in the set of thresholds.

17. The communication device of claim 15, wherein the set of processors comprises at least one processor configured to initiate disabling the communication via the first data rate by initiating disabling of a receive path when one or more parameters includes at least one of packet retransmission rate or retransmission timer results that exceeds a corresponding threshold in the set of thresholds.

* * * * *